(12) United States Patent
Collier, II

(10) Patent No.: US 8,267,696 B2
(45) Date of Patent: Sep. 18, 2012

(54) ROLL OUT STRATEGY ANALYSIS DATABASE APPLICATION

(75) Inventor: James Patrick Collier, II, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 1413 days.

(21) Appl. No.: 11/519,550

(22) Filed: Sep. 12, 2006

(65) Prior Publication Data
US 2008/0076106 A1 Mar. 27, 2008

(51) Int. Cl.
*G09B 3/00* (2006.01)
(52) U.S. Cl. ........ 434/322; 434/118; 434/236; 434/323; 434/350; 434/353; 434/362
(58) Field of Classification Search .................. 434/118, 434/236, 322, 323, 350, 353, 362
See application file for complete search history.

(56) References Cited

U.S. PATENT DOCUMENTS

| | | | | |
|---|---|---|---|---|
| 5,316,485 A | * | 5/1994 | Hirose | 434/322 |
| 5,788,504 A | | 8/1998 | Rice et al. | |
| 6,126,448 A | * | 10/2000 | Ho et al. | 434/219 |
| 6,149,441 A | * | 11/2000 | Pellegrino et al. | 434/350 |
| 6,157,808 A | | 12/2000 | Hollingsworth | |
| 6,164,975 A | * | 12/2000 | Weingarden et al. | 434/322 |
| 6,213,780 B1 | * | 4/2001 | Ho et al. | 434/219 |
| 6,287,123 B1 | * | 9/2001 | O'Brien | 434/118 |
| 6,353,447 B1 | * | 3/2002 | Truluck et al. | 715/733 |
| 6,370,355 B1 | * | 4/2002 | Ceretta et al. | 434/350 |
| 6,398,556 B1 | * | 6/2002 | Ho et al. | 434/219 |
| 6,457,975 B1 | * | 10/2002 | Miranda et al. | 434/236 |
| 6,554,618 B1 | * | 4/2003 | Lockwood | 434/322 |
| 6,587,668 B1 | * | 7/2003 | Miller et al. | 434/350 |
| 6,711,378 B2 | * | 3/2004 | Kashima | 434/350 |
| 6,790,044 B1 | * | 9/2004 | Hagebarth | 434/322 |
| 6,884,074 B2 | * | 4/2005 | Theilmann | 434/118 |
| 2002/0142278 A1 | * | 10/2002 | Whitehurst et al. | 434/350 |
| 2003/0017442 A1 | * | 1/2003 | Tudor et al. | 434/322 |
| 2004/0002039 A1 | * | 1/2004 | Draper et al. | 434/118 |
| 2004/0133437 A1 | * | 7/2004 | Draper et al. | 705/1 |
| 2005/0086095 A1 | | 4/2005 | Moll | |
| 2006/0024655 A1 | | 2/2006 | Bambrick et al. | |
| 2006/0147882 A1 | * | 7/2006 | Sambucetti et al. | 434/219 |

OTHER PUBLICATIONS

Devaraj et al., "How to Measure the Relationship Between Training and Job Performance", Communications of the ACM, May 2004, vol. 47, No. 5, pp. 63-67.
Nelson et al., "The Assessment of End-User Training Needs", Communication of the ACM, Jul. 1995, vol. 38, No. 7, pp. 27-39.
Owen, "The Role of Organisational Context in Mediating Workplace Learning and Performance", Computers in Human Behavior 17 (2001), Australia, pp. 597-614.

* cited by examiner

*Primary Examiner* — Xuan Thai
*Assistant Examiner* — Alvin Carlos
(74) *Attorney, Agent, or Firm* — Yee & Associates, P.C.; John R. Pivnichny

(57) ABSTRACT

A computer implemented method, apparatus, and computer usable program code for developing training for a client. Training delivery requirements for a client are identified. Assessment information is gathered. A training curriculum is developed based on the training delivery requirements and the assessment information. An amount of time required to complete the training is estimated to form a delivery estimate. The delivery estimate is translated into an estimate of resources required for development of training materials for the training. Verification is performed to verify that the client receives the training materials for delivery to an end user.

17 Claims, 17 Drawing Sheets

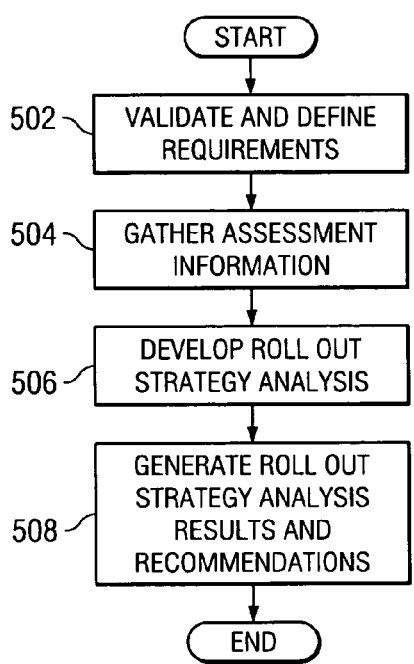
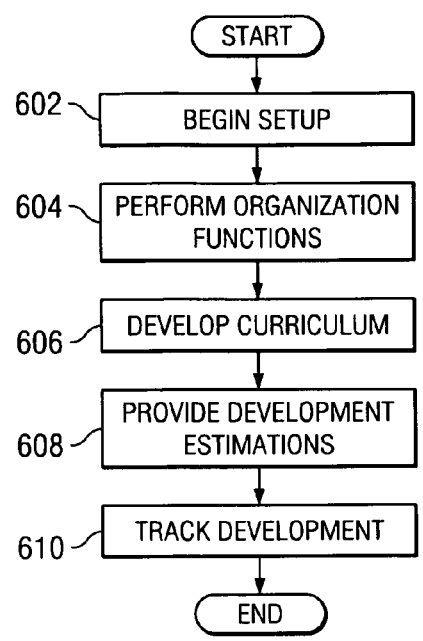
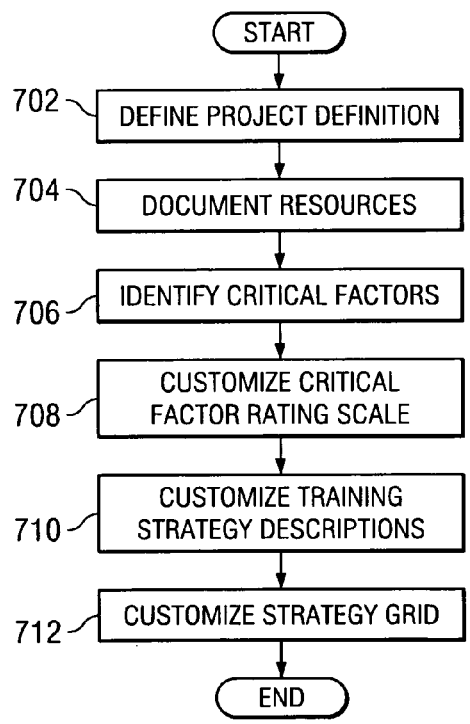

| Roll Out Strategy Analysis | |
|---|---|
| Phase 1: Set-Up | Step 5 — Customize Training Strategy Definitions |
| Step 1: Project Definition  1104 | Customize the title, duration and definition of each training strategy to best fit the environment and needs of the organization to be trained. The definitions can reflect the selected critical factor questions from step 3. |
| Step 2: Resources | |
| Step 3: Critical Factors | 1  *Title: [No Training Required]  Abbreviation: NTR  *Duration: [0] Minutes |
| Step 4: Critical Factors Scale | *Description  [No special training or support is recommended for this function/feature/task for this end-user group.]  1120 |
| Step 5: Training Strategies | |
| Step 6: Strategy Grid  1102 | 2  *Title: [Quick Reference Guide Only]  Abbreviation: QRG  *Duration: [5] Minutes |
| Phase 2: SME Functions | *Description  [Task is not so difficult that it requires formal training, but a quick reference guide would help to clarify understanding of a process or task.]  1122 |
| Step 7: Job Roles | |
| Step 8: Job Tasks | 3  *Title: [Process Training]  Abbreviation: P  *Duration: [15] Minutes |
| Step 9: Tasks to Job Role | *Description  [This is an overview of the business processes relating to a course. The courseware provides the big picture through an asynchronous WBT that puts the function in perspective – "Here is what this feature/function is, where it is and why we need to know it..." Process learning can include discovery, text and graphic description(s), and reinforcement activities (duration=minutes/screen).]  1124 |
| Step 10: Job Task Evaluation | |
| Phase 3: Curriculum | |
| Step 11: Lessons | |
| Step 12: Courses | |
| Step 13: Curriculums | |
| Step 14: Job Role to Curriculum | |
| Phase 4: Estimator | |
| Step 15: Development Time | |
| Step 16: Modify Development Time | |
| Phase 5: Resource Planner | |
| Step 17: Plan Resources | |
| Phase 6: Development Tracker | |
| Step 18: Record Progress | |
| ROSA Reports | |
| Administrator Functions | |
| Exit ROSA | [Save] |

FIG. 11F

Roll Out Strategy Analysis — 1100

Phase 1: Set-Up — 1104
- Step 1: Project Definition
- Step 2: Resources
- Step 3: Critical Factors
- Step 4: Critical Factors Scale
- Step 5: Training Strategies
- Step 6: Strategy Grid — 1102

Phase 2: SME Functions
- Step 7: Job Roles
- Step 8: Job Tasks
- Step 9: Tasks to Job Role
- Step 10: Job Task Evaluation

Phase 3: Curriculum
- Step 11: Lessons
- Step 12: Courses
- Step 13: Curriculums
- Step 14: Job Role to Curriculum

Phase 4: Estimator
- Step 15: Development Time
- Step 16: Modify Development Time

Phase 5: Resource Planner
- Step 17: Plan Resources

Phase 6: Development Tracker
- Step 18: Record Progress

ROSA Reports
Administrator Functions
Exit ROSA

---

Step 17 — Determine Resource Requirements

1134:
- Number of Resources: 8
- Total Weekly Rate: $29,560
- Total Resource Cost: $258,560

1136:
- Number of Weeks (Combined): 36.00
- Number of Hours (Combined): 2,720.00

| Resource Title | Band | Rate | Qty. | Dur. | Total Hours | Weekly Rate | Total |
|---|---|---|---|---|---|---|---|
| Developer | 7 | $96 | 3 | 12 | 1440 | $11,520 | $138,240 |
| Editor | 7 | $87 | 1 | 6 | 240 | $3,480 | $20,880 |
| Lead Developer | 8 | $103 | 1 | 14 | 560 | $4,120 | $57,680 |
| Trainer | 7 | $87 | 3 | 4 | 480 | $10,440 | $41,760 |
| * | | $0 | 0 | 0 | | | |

1138

*Required Field*
- Rate is Hourly and can be "0" -
- Duration is Weekly (based on a 40 hour week) -

Refresh

*FIG. 12*

| | |
|---|---|
| MANAGERIAL ACCOUNTANT SUPERVISOR | CAD0_DISPLAY TIME SHEET DATA |
| MANAGERIAL ACCOUNTANT SUPERVISOR | CAT5_DATA TRANSFER CATS -> PS |
| MANAGERIAL ACCOUNTANT SUPERVISOR | CAT7_CATS: TRANSFER DATA TO CO |
| ACCOUNTING SUPERVISOR | F-81_REVERSE POSTING FOR ACCR/DEFER DOCUMENTS |
| ACCOUNTING SUPERVISOR | F-02_ENTER G/L ACCOUNT POSTING |
| ACCOUNTING SUPERVISOR | F-03_CLEAR G/L ACCOUNT |
| ACCOUNTS PAYABLE | F-04_POST WITH CLEARING |
| ACCOUNTS PAYABLE | F-21_ENTER TRANSFER POSTING |
| ACCOUNTS PAYABLE | F-42_ENTER TRANSFER POSTING |
| BUDGET ANALYST | FMAVCR02_OVERVIEW OF OVERALL VALUES |
| BUDGET ANALYST | FMBB_BUDGETING WORKBENCH |
| BUDGET ANALYST | FMCCOVR_REASSIGN OPEN COMMITMENT |

*FIG. 13A*

| ABBREV | TITLE | DURATION | DESCRIPTION |
|---|---|---|---|
| NTR | NO TRAINING REQUIRED | 0 | NO SPECIAL TRAINING OR SUPPORT IS RECOMMENDED FOR THIS FUNCTION/FEATURE/TASK FOR THIS END-USER GROUP. |
| QRG | QUICK REFERENCE GUIDE ONLY | 15 | USE 15 MINUTES AS A MULTIPLIER FOR THE EFFORT TO DEVELOP THE QUICK REFERENCE GUIDE. |
| P | PROCESS TRAINING | 15 | THIS IS AN OVERVIEW OF THE BUSINESS PROCESSES RELATING TO A COURSE. THE COURSEWARE PROVIDES THE BIG PICTURE THROUGH AN ASYNCHRO. |
| SIM1 | STANDARD TUTORIAL | 10 | PLAYS THE CAPTURE BACK WITH NO EXPECTED INPUT FROM THE USER. |
| SIM2 | AUTO PLAYBACK TUTORIAL | 20 | PROMPTS THE USER TO REPRODUCE THE MOUSE AND KEYBOARD INPUTS. |
| SIM3 | SELF TEST TUTORIAL | 30 | A SELF-GUIDED LEARNING MODE. |
| ILT1 | LEVEL 1 INSTRUCTOR-LED TRAINING | 35 | PHYSICAL CLASSROOM TRAINING FOR PROCEDURES RATED AS VERY DIFFICULT TO LEARN AND VERY IMPORTANT TO JOB SUCCESS. ILT1 INSTRUCTION. |
| ILT2 | LEVEL 2 INSTRUCTOR-LED TRAINING | 15 | PHYSICAL CLASSROOM TRAINING FOR PROCEDURES RATED AS IMPORTANT AND MODERATELY DIFFICULT TO LEARN. THESE PROCEDURES ARE LESS COMPLICATED. |
| ILT3 | LEVEL 3 INSTRUCTOR-LED TRAINING DEMONSTRATION | 25 | PHYSICAL CLASSROOM TRAINING FOR PROCEDURES RATED AS EASY, TO LEARN, WITH A FREQUENCY OF DAILY OR WEEKLY. ILT3 INSTRUCT |

TO FIG. 13B

| | | | |
|---|---|---|---|
| EX1 | LEVEL 1 EXERCISE | 10 | A LEVEL 1 EXERCISE IS AN EXERCISE DESIGNED TO ILLUSTRATE THE FUNCTIONAL USE OF SPECIFIC FEATURES, FUNCTIONS, TOPICS OR TASKS |
| EX2 | LEVEL 2 EXERCISE | 15 | A LEVEL 2 EXERCISE IS A MULTITASK EXERCISE FOR THE STUDENT TO PRACTICE THE CONCEPTS AND PROCEDURES LEARNED IN THE INSTRUCTIONAL METHOD |
| EX3 | LEVEL 3 EXERCISE | 30 | A LEVEL 3 EXERCISE IS A COMPLEX MULTITASK EXERCISE FOR THE STUDENT TO PRACTICE THE CONCEPTS AND PROCEDURES LEARNED IN THE INSTRUCTIONAL METHOD |
| VC1 | VIRTUAL CLASSROOM 1 | 10 | [MAPS TO INSTRUCTOR LEAD ABOVE] |
| VC2 | VIRTUAL CLASSROOM 2 | 10 | CUSTOMIZE DEFINITION |
| VC3 | VIRTUAL CLASSROOM 3 | 10 | CUSTOMIZE DEFINITION |
| ESP1 | ELECTRON PERFORMANCE SUPPORT 1 | 10 | [MAPS TO EXERCISES ABOVE, ESSENTIALLY THE 4-TIER MODULE OF AWARENESS TO FLUENCY, FOR EPSS THE AMOUNT OF DOCUMENTATION, SCREEN.] |

FROM FIG. 13A

Recommendations Grid

| Order | CF | NTR | QRG | P | ILT1 | ILT2 | ILT3 | EX1 | EX2 | EX3 |
|---|---|---|---|---|---|---|---|---|---|---|
| 1 | 000 | ☑ | ☐ | ☐ | ☐ | ☐ | ☐ | ☐ | ☐ | ☐ |
| 2 | 001 | ☑ | ☐ | ☐ | ☐ | ☐ | ☐ | ☐ | ☐ | ☐ |
| 3 | 002 | ☐ | ☐ | ☑ | ☐ | ☑ | ☐ | ☐ | ☑ | ☐ |
| 4 | 010 | ☑ | ☐ | ☐ | ☐ | ☐ | ☐ | ☐ | ☐ | ☐ |
| 5 | 011 | ☐ | ☑ | ☐ | ☑ | ☐ | ☐ | ☑ | ☐ | ☐ |
| 6 | 012 | ☐ | ☐ | ☑ | ☐ | ☑ | ☐ | ☐ | ☑ | ☐ |
| 7 | 020 | ☐ | ☑ | ☐ | ☑ | ☐ | ☐ | ☑ | ☐ | ☐ |
| 8 | 021 | ☐ | ☐ | ☑ | ☑ | ☐ | ☐ | ☐ | ☑ | ☐ |
| 9 | 022 | ☐ | ☐ | ☑ | ☐ | ☐ | ☑ | ☐ | ☐ | ☑ |
| 10 | 100 | ☑ | ☐ | ☐ | ☐ | ☐ | ☐ | ☐ | ☐ | ☐ |
| 11 | 101 | ☐ | ☑ | ☐ | ☐ | ☐ | ☐ | ☐ | ☐ | ☐ |
| 12 | 102 | ☐ | ☐ | ☑ | ☐ | ☑ | ☐ | ☐ | ☑ | ☐ |
| 13 | 110 | ☐ | ☑ | ☐ | ☐ | ☐ | ☐ | ☐ | ☐ | ☐ |
| 14 | 111 | ☐ | ☑ | ☐ | ☑ | ☐ | ☐ | ☑ | ☐ | ☐ |
| 15 | 112 | ☐ | ☐ | ☑ | ☐ | ☑ | ☐ | ☐ | ☑ | ☐ |
| 16 | 120 | ☐ | ☐ | ☑ | ☑ | ☐ | ☐ | ☑ | ☐ | ☐ |
| 17 | 121 | ☐ | ☐ | ☑ | ☐ | ☑ | ☐ | ☐ | ☑ | ☐ |
| 18 | 122 | ☐ | ☐ | ☑ | ☐ | ☐ | ☑ | ☐ | ☐ | ☑ |
| 19 | 200 | ☐ | ☑ | ☐ | ☑ | ☐ | ☐ | ☑ | ☐ | ☐ |
| 20 | 201 | ☐ | ☑ | ☐ | ☑ | ☐ | ☐ | ☑ | ☐ | ☐ |
| 21 | 202 | ☐ | ☐ | ☑ | ☐ | ☐ | ☑ | ☐ | ☐ | ☑ |
| 22 | 210 | ☐ | ☑ | ☐ | ☑ | ☐ | ☐ | ☑ | ☐ | ☐ |
| 23 | 211 | ☐ | ☑ | ☐ | ☑ | ☐ | ☐ | ☑ | ☐ | ☐ |
| 24 | 212 | ☐ | ☐ | ☑ | ☐ | ☐ | ☑ | ☐ | ☐ | ☑ |
| 25 | 220 | ☐ | ☐ | ☑ | ☐ | ☑ | ☐ | ☐ | ☑ | ☐ |
| 26 | 221 | ☐ | ☐ | ☑ | ☐ | ☐ | ☑ | ☐ | ☐ | ☑ |
| 27 | 222 | ☐ | ☐ | ☑ | ☐ | ☐ | ☑ | ☐ | ☐ | ☑ |

| | WBT1 | WBT2 | WBT3 | Sim1 | Sim2 | Sim3 | VC1 | VC2 | VC3 | Cust1 | Cust2 | Cust3 |
|---|---|---|---|---|---|---|---|---|---|---|---|---|
| | ☐ | ☐ | ☐ | ☐ | ☐ | ☐ | ☐ | ☐ | ☐ | ☐ | ☐ | ☐ |
| | ☐ | ☐ | ☐ | ☐ | ☐ | ☐ | ☐ | ☐ | ☐ | ☐ | ☐ | ☐ |
| | ☐ | ☑ | ☐ | ☐ | ☑ | ☐ | ☐ | ☑ | ☐ | ☐ | ☐ | ☐ |
| | ☐ | ☐ | ☐ | ☐ | ☐ | ☐ | ☐ | ☐ | ☐ | ☐ | ☐ | ☐ |
| | ☑ | ☐ | ☐ | ☑ | ☐ | ☐ | ☑ | ☐ | ☐ | ☐ | ☐ | ☐ |
| | ☐ | ☐ | ☑ | ☐ | ☐ | ☑ | ☐ | ☑ | ☐ | ☐ | ☐ | ☐ |
| | ☐ | ☑ | ☐ | ☐ | ☑ | ☐ | ☐ | ☑ | ☐ | ☐ | ☐ | ☐ |
| | ☐ | ☑ | ☐ | ☐ | ☑ | ☐ | ☐ | ☑ | ☐ | ☐ | ☐ | ☐ |
| | ☐ | ☐ | ☐ | ☐ | ☐ | ☐ | ☐ | ☐ | ☑ | ☐ | ☐ | ☐ |
| | ☐ | ☐ | ☐ | ☐ | ☐ | ☐ | ☐ | ☐ | ☐ | ☐ | ☐ | ☐ |
| | ☑ | ☐ | ☐ | ☑ | ☐ | ☐ | ☑ | ☐ | ☐ | ☐ | ☐ | ☐ |
| | ☐ | ☐ | ☑ | ☐ | ☐ | ☑ | ☐ | ☑ | ☐ | ☐ | ☐ | ☐ |
| | ☑ | ☐ | ☐ | ☑ | ☐ | ☐ | ☑ | ☐ | ☐ | ☐ | ☐ | ☐ |
| | ☑ | ☐ | ☐ | ☑ | ☐ | ☑ | ☑ | ☐ | ☐ | ☐ | ☐ | ☐ |
| | ☐ | ☐ | ☑ | ☐ | ☐ | ☑ | ☐ | ☑ | ☐ | ☐ | ☐ | ☐ |
| | ☐ | ☑ | ☐ | ☐ | ☑ | ☐ | ☐ | ☑ | ☐ | ☐ | ☐ | ☐ |
| | ☐ | ☑ | ☐ | ☐ | ☑ | ☐ | ☐ | ☑ | ☐ | ☐ | ☐ | ☐ |
| | ☐ | ☐ | ☐ | ☐ | ☐ | ☐ | ☐ | ☑ | ☐ | ☐ | ☐ | ☐ |
| | ☑ | ☐ | ☐ | ☑ | ☐ | ☐ | ☑ | ☐ | ☐ | ☐ | ☐ | ☐ |
| | ☑ | ☐ | ☐ | ☑ | ☐ | ☐ | ☑ | ☐ | ☐ | ☐ | ☐ | ☐ |
| | ☐ | ☐ | ☑ | ☐ | ☐ | ☐ | ☐ | ☑ | ☐ | ☐ | ☐ | ☐ |
| | ☑ | ☐ | ☐ | ☑ | ☐ | ☐ | ☑ | ☐ | ☐ | ☐ | ☐ | ☐ |
| | ☐ | ☑ | ☐ | ☐ | ☑ | ☐ | ☐ | ☑ | ☐ | ☐ | ☐ | ☐ |
| | ☐ | ☐ | ☐ | ☐ | ☐ | ☐ | ☐ | ☐ | ☑ | ☐ | ☐ | ☐ |
| | ☐ | ☐ | ☑ | ☐ | ☐ | ☑ | ☐ | ☑ | ☐ | ☐ | ☐ | ☐ |
| | ☐ | ☐ | ☑ | ☐ | ☐ | ☐ | ☐ | ☑ | ☐ | ☐ | ☐ | ☐ |
| | ☐ | ☐ | ☐ | ☐ | ☐ | ☐ | ☐ | ☐ | ☑ | ☐ | ☐ | ☐ |

FROM FIG. 14A

1404

ROLL OUT STRATEGY ANALYSIS DATABASE APPLICATION

BACKGROUND OF THE INVENTION

1. Field of the Invention

The present invention relates generally to an improved data processing system. More particularly, the present invention relates to a computer implemented method, apparatus, and computer usable program code for delivering training to a client organization.

2. Description of the Related Art

Companies, organizations, and other enterprises often roll out new technology, policies, and procedures. Each time a change is made, a major training effort is generally required to teach the employees how to implement and function with the change. In some cases, individuals must be retrained how to use a technology. In other cases, job roles may change extensively, requiring a large-scale training initiative.

Consultants or other groups may be hired to perform the training effort. In many cases, the training effort requires complex decisions based on factors, such as cost, schedule, complexity, technical requirements, training requirements, job roles, job tasks, customer support, and probabilities of success and failure. Performing the training, based on all of these factors, may be very complex. Traditionally, such training efforts have been done using pen and paper requiring large amounts of individual time and effort. Additionally, keeping the client organization apprised of cost, status, and schedule requires additional reporting and effort.

Attempts have been made to use existing spreadsheet applications to organize the training information. Because of the large amount of related information, the spreadsheets become extremely complex very quickly requiring time and effort to effectively track the training effort. Most individuals do not have the spreadsheet development skills required for such a complicated solution.

SUMMARY OF THE INVENTION

The illustrative embodiments provide a computer implemented method, apparatus, and computer usable program code for developing training for a client. Training delivery requirements for a client are identified. Assessment information is gathered. A training curriculum is developed based on the training delivery requirements and the assessment information. An amount of time required to complete the training is estimated to form a delivery estimate. The delivery estimate is translated into an estimate of resources required for development of training materials for the training. Verification is performed to verify that the client receives the training materials for delivery to an end user.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 5 is a flowchart for Roll Out Strategy Analysis process steps in accordance with the illustrative embodiments;

FIG. 6 is a flowchart for a general Roll Out Strategy Analysis process in accordance with the illustrative embodiments;

FIG. 7 is a flowchart for a process for setting up a training project in accordance with the illustrative embodiments;

FIG. 11C is an example of a graphical user interface that may be used to customize training delivery strategies in accordance with the illustrative embodiments;

FIG. 11F is an example of a graphical user interface that may be used to determine resource requirements in accordance with the illustrative embodiments;

FIG. 12 is an exemplary list of job roles and job tasks in accordance with the illustrative embodiments;

FIGS. 13A-13B are exemplary lists of training strategies in accordance with the illustrative embodiments; and FIGS. 14A-14B are exemplary strategy grids in accordance with the illustrative embodiments.

DETAILED DESCRIPTION OF THE PREFERRED EMBODIMENT

Figure 1:
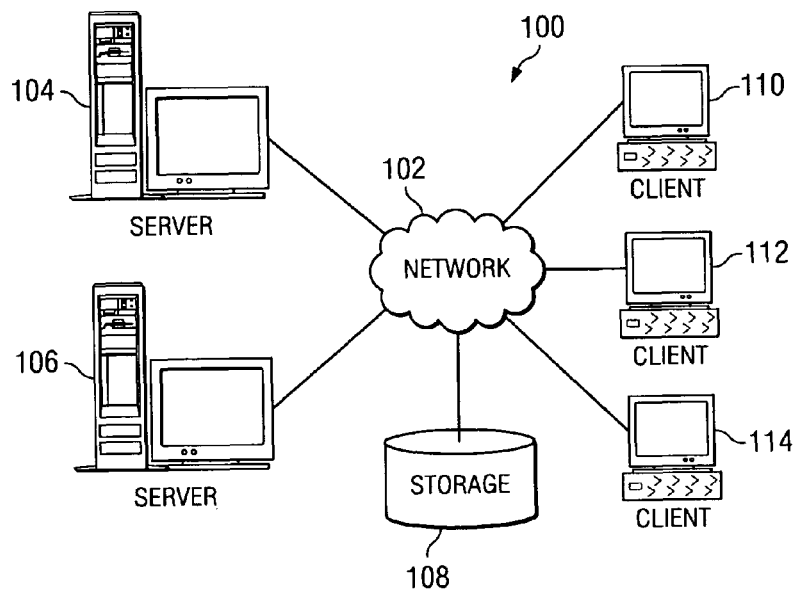
FIG. 1 is a pictorial representation of a data processing system in which the illustrative embodiments may be implemented.
Figure 2:
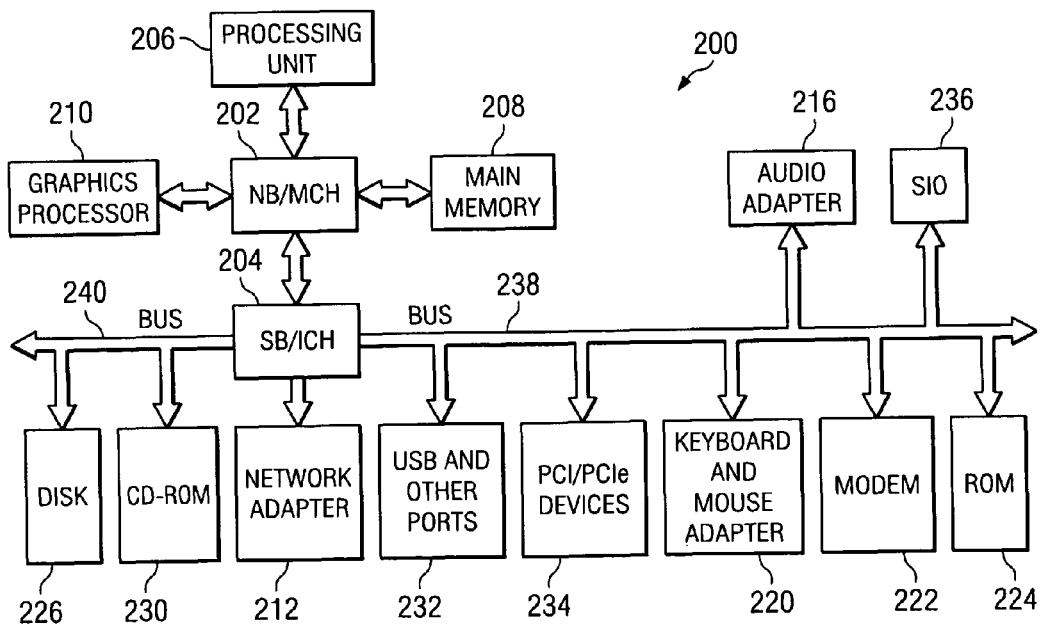
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for delivering training to a client organization. In an illustrative embodiment, a database application is used to provide a Roll Out Strategy Analysis (ROSA). A Roll Out Strategy Analysis is a process for performing a large training initiative, project, or effort. A Roll Out Strategy Analysis approach is appropriate in any environment in which there is a relative degree of change from one way of doing business to another, such as with the implementation of a new point of sales, accounting, warehousing system, or with restructuring of an organizational structure that may require personnel or other employees to learn new job role activities. In these examples, the database application may be used by a consultant, in-house employee, or other individual internally within the organization or externally as contracted.

The database application provides a methodology for professionally developing a Roll Out Strategy Analysis even without all of the skills or experience typically required for such a process. By using the database application, the client is provided a roadmap for the training initiative, training development resource and cost projections, and required technical infrastructure. The roadmap includes a projected schedule including estimates of delivery and development times. The training materials are delivered to the client based on the needs of the training project. The training materials are all resources, materials, and other information that may be required to effectively implement the required training project. Additionally, the training developer may track the implementation of the training development and verify that the client receives the training materials for delivery to an end user. For example, the client may be an electronic storage company, and the end user may be an employee that needs to learn new billing software and procedures that is the subject of the training project.

Figure 3:
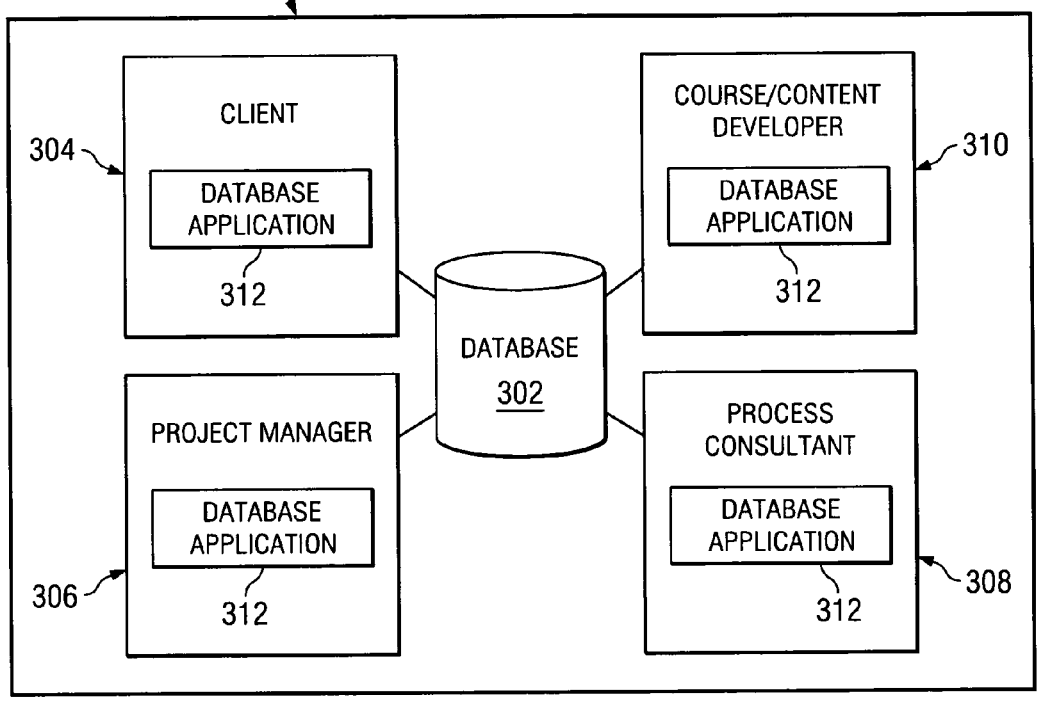
FIG. 3 is a diagram of a data processing system in which the illustrative embodiments may be implemented.

FIG. 3 is a diagram of a data processing system in which the illustrative embodiments may be implemented. Data processing system 300 includes various components including database 302, client 304, project manager 306, process consultant 308, and course/content developer 310. Each component may be interconnected via a network, such as network 102 of FIG. 1.

Database 302 is a database, storing information regarding the Roll Out Strategy Analysis (ROSA) for the training project. Database 302 may be stored in storage 108 of FIG. 1. Client 304, project manager 306, process consultant 308, and course/content developer 310 may be clients, such as clients 110, 112, and 114 of FIG. 1. Each client device may execute or otherwise use database application 312 to access Roll Out Strategy Analysis database 302.

In the depicted examples, database application 312 is a user friendly tool that walks the user through the Roll Out Strategy Analysis in a step-by-step sequence. The user of database application 312 need not have a mastery of the skills sets typically required for a training project because of the automatic sequencing implemented by database application 312. Database application 312 allows the user to fully use the Roll Out Strategy Analysis. Database application 312 allows the import and export of database 302 content at various stages for off-line work and collaboration, development of a training curriculum based on the completed training analysis, a development time estimator to assist the consultant in determining the work effort required to develop the prescribed training, a development progress tracker, and phase/step specific reports for analysis development and client presentations.

In an illustrative embodiment, database application 312, accessible by project manager 306, may also include resource planning information and a resource planning feature that is a module of database application 312. Resource planning information provides necessary development resources to satisfy the estimated development time established by the Roll Out Strategy Analysis training analysis and a final training curriculum.

In some cases, control of database application 312 may be managed by a client organization. In such a case, project manager 306, a consultant, or separate internal group, may not want all potential users to have access to potentially sensitive information. Particularly, the resource planning information accessible exclusively by project manager 306 may provide resource rate, billing, proprietary, or other business information that a consultant may not want accessible to the client organization. Access to resource planning information may be configured in a resource planning feature to allow only specified individuals based on a password, encryption, or other secure data accessing methods and procedures.

Database application 312 provides many benefits to individuals involved in a training project including: improved estimation of the scope and size of the training project, speedier development of a blended training solution for the client, decreased training development time due to improved planning and analysis, decreases in the time required for competency of individuals being trained, more accurate total planning values and costs, automatic application of standard formulas to provide the total planning values, and increased client confidence that the training solution matches the job processes. The scope of any training effort is the overall size and shape of the task including how many tasks/topics, lessons, courses, curriculums and personnel are to be taught, how long it will likely take the training to be developed, and how long it will take for the training to be delivered. As described, curriculums are the broadest training organization. Additionally, curriculums are composed of courses, courses are composed of lessons, and lessons are composed of topics.

A blended training solution is a combination of more than one delivery method. A typical blending will include web-based training elements in a classroom environment. The planning values are figures which refer to the number of resources required to develop training programs and the cost associated with retaining those resources. Total planning values are used as a resource planning activity intended to help determine the necessary size of the development team over a specific period of time for a specific cost. Standard formulas are formulas embedded into database application 312 intended to reduce the risk of "human error".

Additionally, using database application 312 decreases the margin of error, involves the client in the analysis and planning stages of the training project, reduces future scope and budget changes to the project, and ensures a proper governance structure for training development and delivery.

Figure 4:
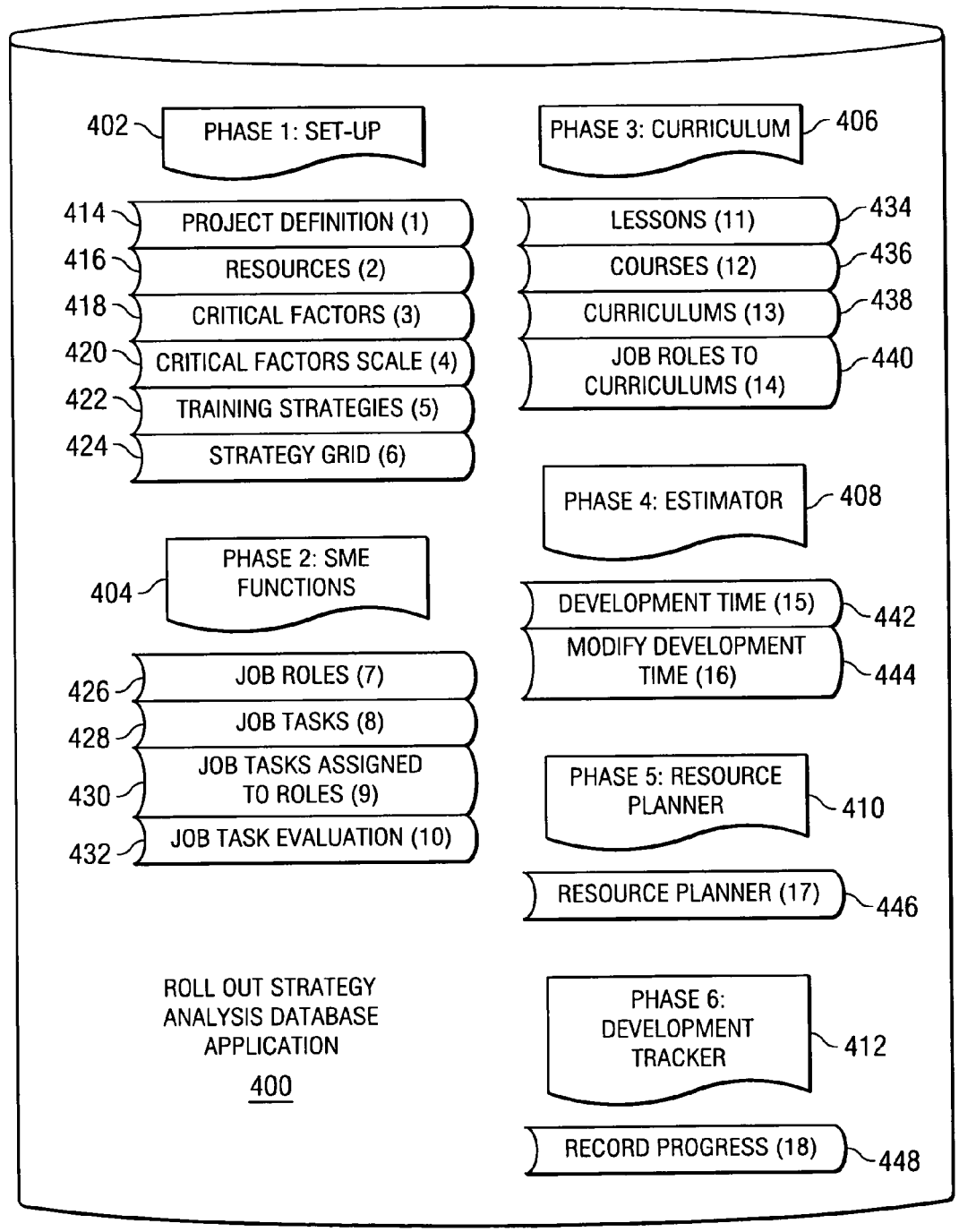
FIG. 4 is a block diagram of a Roll Out Strategy Analysis database application in accordance with the illustrative embodiments.

FIG. 4 is a block diagram of a Roll Out Strategy Analysis database application in accordance with the illustrative embodiments. Database application 400 includes various modules that may be used to walk an application user through the training project. Each module may represent a phase and steps in the sequence used by database application 400 for walking a user through the training project.

Phases include set-up 402, SME functions 404, curriculum 406, estimator 408, resource planner 410, and development tracker 412. Steps include project definition 414, resources 416, critical factors 418, critical factors scale 420, training strategies 422, strategy grid 424, job roles 426, job tasks 428, job tasks assigned to roles 430, job task evaluation 432, lessons 434, courses 436, curriculums 438, job roles to curriculums 440, development time 442, modify development time 444, resource planner 446, and record progress 448.

Project definition 414 captures project-specific information including goals and anticipated outcomes. In one example, a goal may be the amount of time required for all permanent staff to be fully trained on a new data access program. Resources 416 is the resource documentation including a list created to track the individuals working on the training project. Resources 416 may include an engagement manager, client representative, project manager, developer, and subject matter expert. Each of these individuals are resources for the client organization.

Critical factors 418 identify the three most appropriate critical factors for the project analysis. Critical factors 418 may include determinations such as how the task is dependent on other tasks, how difficult the task is to learn, how difficult the task is to perform, how important the task is to your job, and how often the task is implemented. Critical factors 418 may also include questions regarding a required level of expertise, such as what is the degree of change from old to new for the task, what is the impact of making a mistake, and what is the likelihood that someone will make a mistake? Critical factors scale 420 allows the user to customize or modify the default rating scale values to appropriately answer the selected critical factors of critical factors 418. For example, with regard to a critical factor, such as how often is the task is implemented, critical factor scale 420 may specify the task is performed daily, weekly, monthly, quarterly, and yearly. With regard to how difficult the task is to learn, critical factor scale 420 may include not difficult to understand, requires extra thought, skill, or effort, and requires rigorous concentration to assimilate. Critical factor scale 420 for determining the impact of a mistake, may include not likely, not serious, simply redo task, significant effort to correct problem, and regulatory or safety consequences.

Training strategies 422 allow the user to customize or modify the default training strategy descriptions to match project and client needs. Strategy grid 424 allows the user to associate the critical factor rating permutations with a recommended training strategy or training strategy groupings to create training strategy recommendations.

Job roles 426 is a list created to document the varying job roles. Job tasks 428 is a list created to document the varying job tasks. Job tasks assigned to roles 430 align job tasks 428 to job roles 426 to create pairings. In database application 400, a pairing is an association of one data element with another data element. For example, the "F-04_Post with Clearing" job task may be paired with the "Accounting Supervisor" as well as with the "Accounts Payable" job roles. Job task evaluation 432 performs a collaborative effort to match job role titles to recommended training strategy or training strategy groupings by determining appropriate responses to the three critical factor questions for each job task.

Lessons 434 allow the user to build lessons from topics, identify training types, and modify topic delivery times and complexity ratings. A lesson is a logical grouping of topics or a collection of topics that will instruct in the specifics of a particular topic. For example, a lesson may be devoted to training regarding accounts payable. The topics within the lesson may include training for account clearing, executing payments, issuing credit, issuing debits, paying invoices, and end of period processing. A lesson on controlling may include topics such as analyze reports, publish reporting results, run reports, and run selected financial reports. A training type refers to the delivery method, including for example, instructor-led training, web-based training, or virtual classrooms. Topic delivery time is the estimated amount of time it should take to deliver a given topic. When several topics are included in a lesson, the topic delivery times may be summed to arrive at the estimated length of the lesson. When several lessons are included in a course, the lesson delivery times may be summed to arrive at the estimated length of the course. When several courses are included in a curriculum, the course delivery times may be summed to arrive at the estimated length of the curriculum.

Courses 436 allow the user to build and document courses from each lesson. A course is a logical grouping of topics or a collection of topics that instruct in the specifics of a particular topic. For example, a controlling course may include lessons such as controlling overview, profit accounting, cost accounting, and overhead accounting. A course on financial accounting may include lessons, such as financing accounting overview, accounts payable, and accounts receivable. Curriculums 438 allow the user to build and document curriculums from courses. Curriculums 438 is the logical grouping or a collection of courses that make up a training requirement for specific personnel job role types. For example, a curriculum may include manager training for introducing an employee or manager to project management. Job roles to curriculums 440 matches up training materials to job titles. For example, a person charged to document invoices using optical character recognition may need to be trained on the scanning software.

Development time 442 allows the user to enter custom development time factors to adjust for changing project conditions. Modify development time 444 allows the user to adjust the development of any individual topic. Resource planner 446 allows the user to track and plan for resource usage through the training development. Development tracker 412 is used to track and verify that the client receives the training materials necessary to implement the training project. For example, development tracker 412 may ensure that qualified instructors have the know-how and materials to teach a group of fifteen employees of the client organization. Record progress 448 allows the user to enter the percentages completed and the total hours spent in development for each topic as with respect to lessons.

FIG. 5 is a flowchart for Roll Out Strategy Analysis process steps in accordance with the illustrative embodiments. The process of FIG. 5 may be implemented by database application 312 by accessing database 302 both of FIG. 3.

The process begins by validating and defining requirements (step 502). In step 502 the user may use the database application to validate and/or define the training delivery requirements for the learning solution and gather assessment information at the beginning of the training project. The training delivery requirements are the requirements for implementing the training for the client and individual end users or employees. For example, training delivery requirements may specify a deadline for the training, the number of individuals that must be trained, and the available budget. Assessment information is an approach and the information used to gather client requirements to help a consulting team better formulate delivery methods for the final solution.

Next, the database application gathers assessment information (step 504). For example, assessment information may specify the number of employees familiar with computer programs, times available for training, and preferred forms of training delivery. Next, the database application develops Roll Out Strategy Analysis (step 506). The Roll Out Strategy Analysis or project training is developed based on input from the client or customer organization.

Next, the process generates Roll Out Strategy Analysis results and recommendations (step 508) with the process terminating thereafter. The results and recommendations from step 508 are used to: document the scope of the to-be-developed modular blended learning content, align/re-align learning solution priorities as required, continuously augment the learning roadmaps for each learner group/job role, and enhance strategic business impact of the learning solution to individual job role and job task performance. Solution priorities are a balance of priorities used to determine a feasible training solution based on factors, such as available time, budget, and resources.

FIG. 6 is a flowchart for a general Roll Out Strategy Analysis process in accordance with the illustrative embodiments. The process of FIG. 6 may be implemented by database application 312 by accessing database 302 both of FIG. 3. Particularly, the process of FIG. 6 corresponds to the phases described in database application 400 of FIG. 4.

The process begins by beginning setup (step 602). Setup may be performed by a module, such as setup 402 of FIG. 4. Next, the database application performs organization functions (step 604). Organization functions may be performed by a module, such as SME functions 404 of FIG. 4. Next, the database application develops the curriculum (step 606). Curriculum is developed by a module, such as curriculum 406 of FIG. 4. Next, the database application provides development estimations (step 608). Development estimations may be performed by a module such as estimator 408 of FIG. 4. Next, the database application tracks development (step 610) with the process terminating thereafter. Development tracking may be performed by a module, such as development tracker 412 of FIG. 4.

FIG. 7 is a flowchart for a process for setting up a training project in accordance with the illustrative embodiments. The process of FIG. 7 may be implemented by database application 312 by accessing database 302 both of FIG. 3. Particularly, the process of FIG. 7 corresponds to the steps described under setup 402 phase/module of database application 400 of FIG. 4.

The process begins by first defining the project definition (step 702). Next, the database application documents resources (step 704). Next, the database application identifies critical factors (step 706). Next, the database application customizes a critical factor rating scale (step 708). Next, the database application customizes training strategy descriptions (step 710). Next, the database application customizes a strategy grid (step 712) with the process terminating thereafter.

Figure 8:
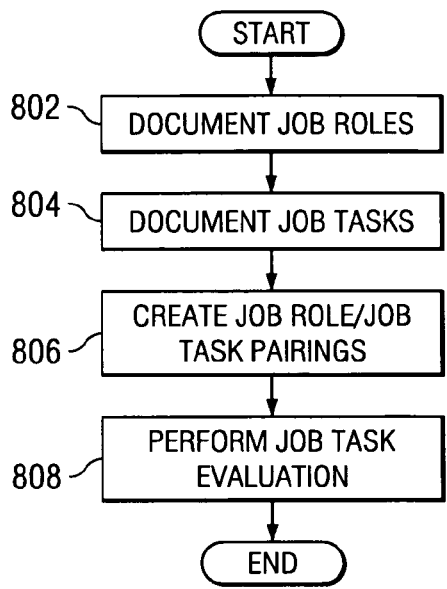
FIG. 8 is a flowchart for a process for performing organization functions in accordance with the illustrative embodiments.

FIG. 8 is a flowchart for a process for performing organization functions in accordance with the illustrative embodiments. The process of FIG. 8 may be implemented by database application 312 by accessing database 302 both of FIG. 3. Particularly, the process of FIG. 8 corresponds to the steps described under SME functions 404 phase/module of database application 400 of FIG. 4.

The process of FIG. 8 begins by documenting job roles (step 802). Next, the database application documents job tasks (step 804). Next, the database application creates job role/job task pairings (step 806). Next, the database application performs job task evaluation (step 808) with the process terminating thereafter.

Figure 9:
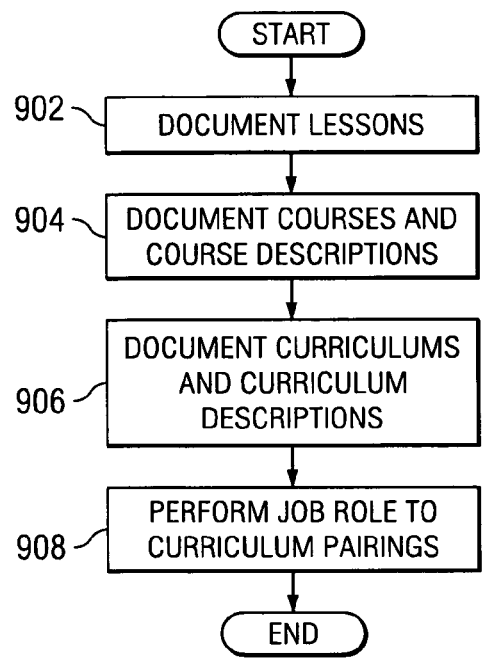
FIG. 9 is a flowchart for a process for developing curriculum in accordance with the illustrative embodiments.

FIG. 9 is a flowchart for a process for developing curriculum in accordance with the illustrative embodiments. The process of FIG. 9 may be implemented by database application 312 by accessing database 302 both of FIG. 3. Particularly, the process of FIG. 9 corresponds to the steps described under curriculum 406 phase/module of database application 400 of FIG. 4.

The process of FIG. 9 begins by documenting lessons (step 902). Next, the database application documents courses and course descriptions (step 904). Next, the database application documents curriculums and curriculum descriptions (step 906). Next, the database application performs job role to curriculum pairings (step 908) with the process terminating thereafter.

Figure 10:
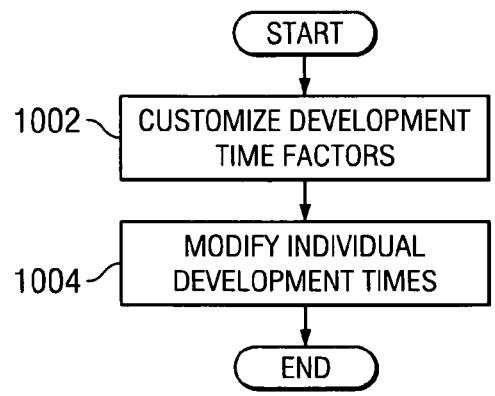
FIG. 10 is a flowchart for a process for providing development estimations in accordance with the illustrative embodiments.

FIG. 10 is a flowchart for a process for providing development estimations in accordance with the illustrative embodiments. The process of FIG. 10 may be implemented by database application 312 by accessing database 302 both of FIG. 3. Particularly, the process of FIG. 10 corresponds to the steps described under estimator 408 phase/module of database application 400 of FIG. 4.

The process of FIG. 10 begins by customizing development time factors (step 1002). Next, the database application modifies individual development times (step 1004) with the process terminating thereafter.

Figure 11A:
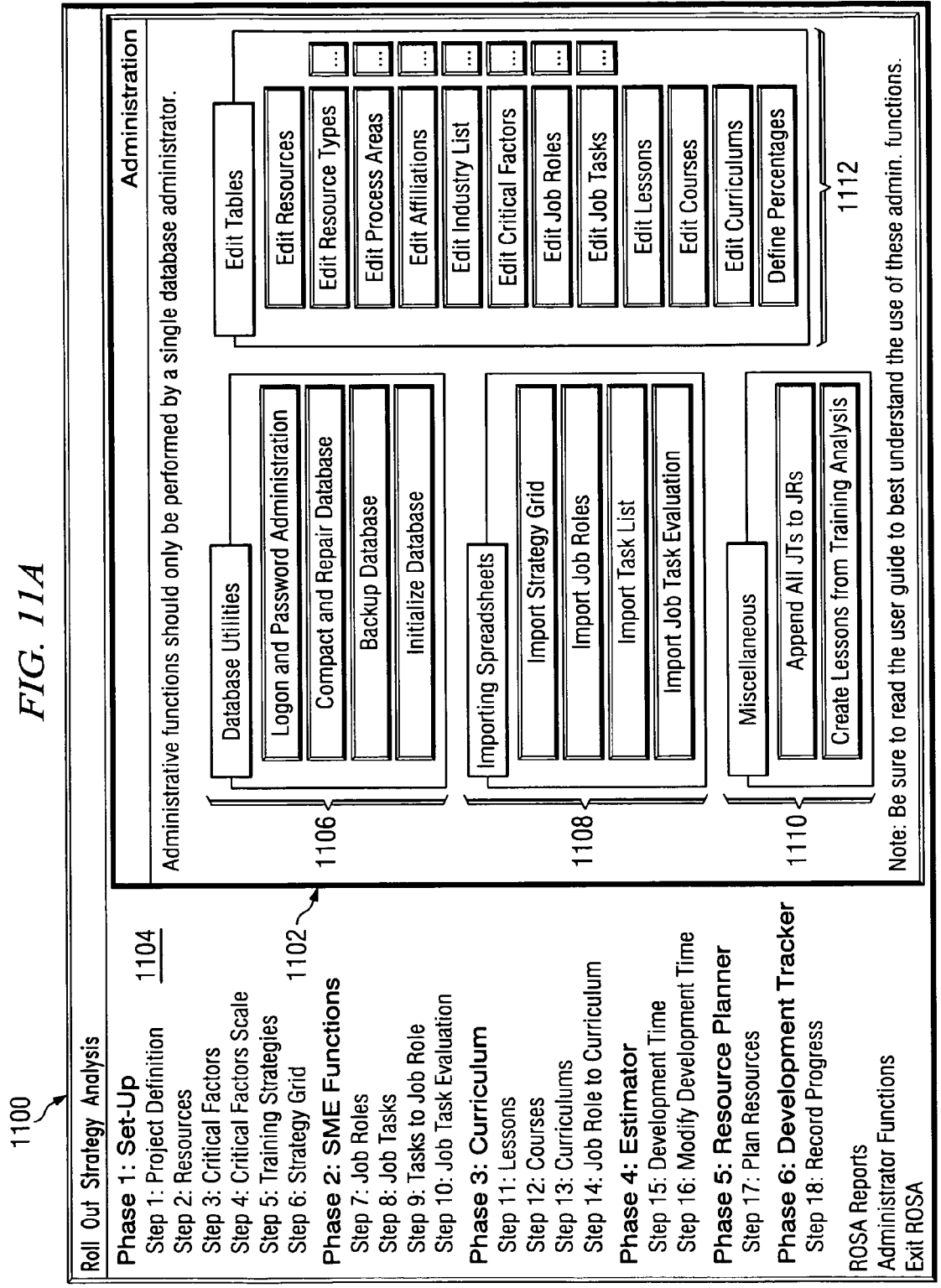
FIG. 11A is an example of a graphical user interface that may be used by a business or consultant to perform administrative functions.

FIG. 11A is a diagram of a graphical user interface for a training project database application in accordance with the illustrative embodiments. Display 1100 may include various visual components, including for example, window 1102 and window 1104. Windows 1102 and 1104 include information that may be displayed to a user to develop, modify, and implement the training project. Windows 1102 and 1104 may be displayed by database application 400 of FIG. 4 or client 304 of FIG. 3.

Display 1100 is an example of a graphical user interface that may be used by implementing a training project. Windows 1102 and 1104 may include icons, buttons, lists, drop down menus, and other visual means to enter and view information. Window 1104 may be used to navigate the phases and steps of the training project as described by database application 400 of FIG. 4. In window 1104, the user may move to a phase or step by selecting a desired action within the database application. Window 1102 may be used to enter information for database 302 through database application 312 both of FIG. 3. Window 1102 may also be used to display training project information to a user.

Window 1104 of FIG. 11A is an example of a graphical user interface that may be used by a business or consultant to perform administrative functions. Section 1106 allows the user to perform administrative tasks, such as logon and password administration, compact and repair the database, backup the database, and database initialization. The user may use section 1108 for importing spreadsheets for the training project. In one example, the user may import a strategy grid, job roles, a task list, or a job task evaluation. As a result, work and effort for the training project may be performed offline at the convenience of the user and then later imported.

Section 1110 provides miscellaneous functions such as appending all job tasks to job roles and creating lessons from the training analysis. An exemplary list of job roles and associated job tasks is shown in FIG. 12. The user may use section 1112 of window 1102 to edit tables, resources, resource types, process areas, affiliations, industry lists, critical factors, job roles, job tasks, lessons, courses, curriculums, and define percentages.

Figure 11B:
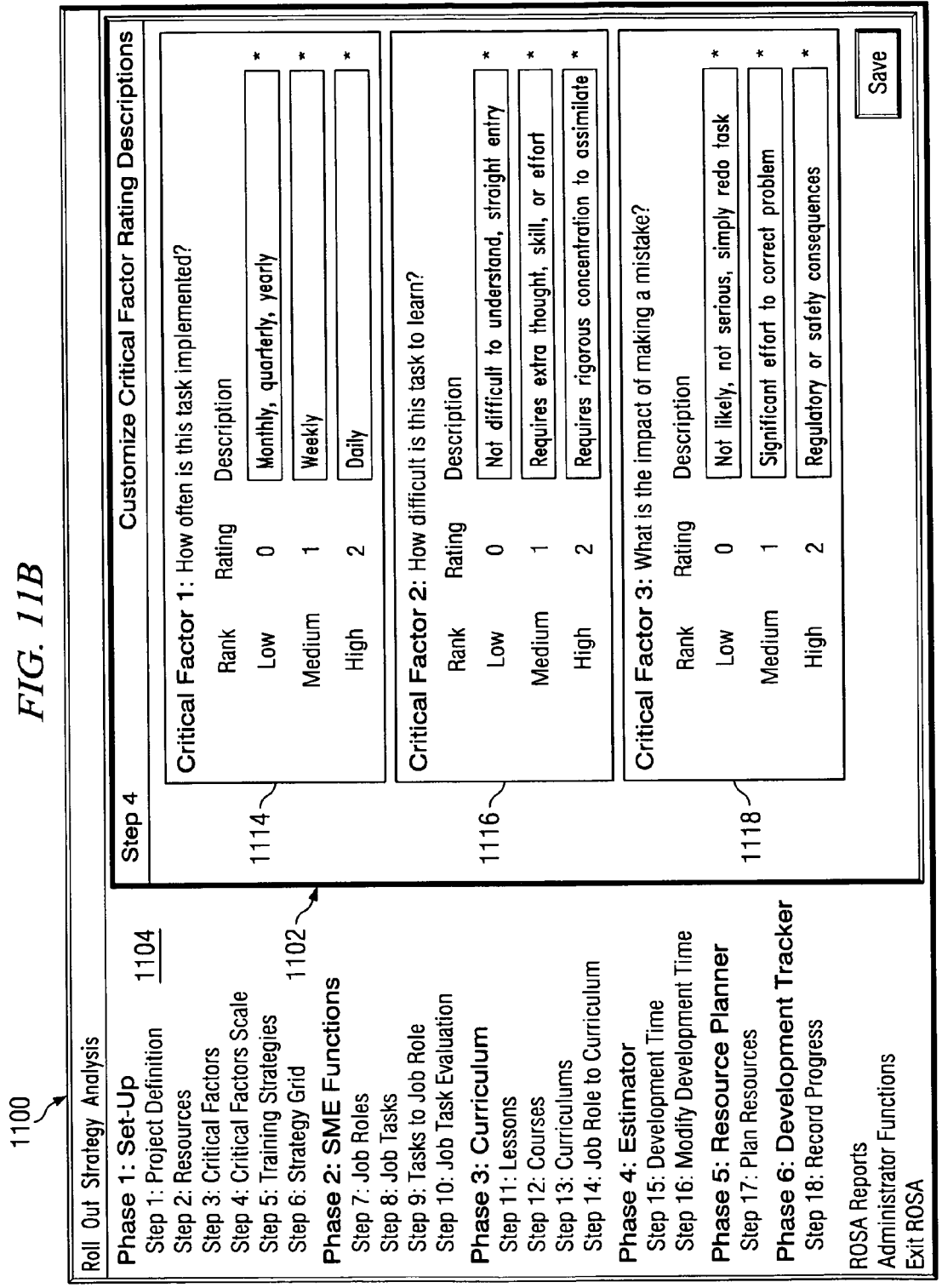
FIG. 11B is an example of a graphical user interface that may be used to customize a critical factor rating scale in accordance with the illustrative embodiments.

Window 1102 of FIG. 11B is an example of a graphical user interface that may be used to customize a critical factor rating scale in accordance with the illustrative embodiments. The graphical user interface may be used to customize critical factors scale 420 of FIG. 4. In section 1114, the user may provide a written description specifying how often a task is implemented. In section 1116, the user may provide a written description specifying how difficult the task is to learn. In section 1118, the user may provide a written description specifying the impact of making a mistake. Each of the critical factors used in sections 1114, 1116, and 1118 affect the time required, skills needed, individual training required for the task, as well as other considerations for development, planning, and implementation.

Window 1102 of FIG. 11C is an example of a graphical user interface that may be used to customize training delivery strategies in accordance with the illustrative embodiments. Different training delivery solutions depend on the specified task. For example, in some cases, a person that is being trained may only need a quick reference guide. In other cases, the complexity of the task may require specific process training, web-based training, and instructor led training. In section 1102, the user may customize the title, duration, and definition or description of each training delivery strategy to best fit the environment and needs of the organization to be trained. The title may specify the title of the training delivery method or type. The duration may be used to indicate a probable training time required to complete or deliver the training in minutes. The description is a written explanation describing the function, feature, tasks, or process. Section 1102 defines individual delivery strategies.

Sections 1120, 1122, and 1124 describe increasingly more involved training delivery requirements. In the exemplary text of section 1120, the first training strategy does not require training or support for the function, feature, or task to be performed. The exemplary text of section 1122 specifies that the task may require a quick reference guide but no formal training. The exemplary text of section 1124 specifies that the task requires process training that may include text, graphics, video demonstrations, sample tasks, and other reinforcement activities.

Figure 11D:
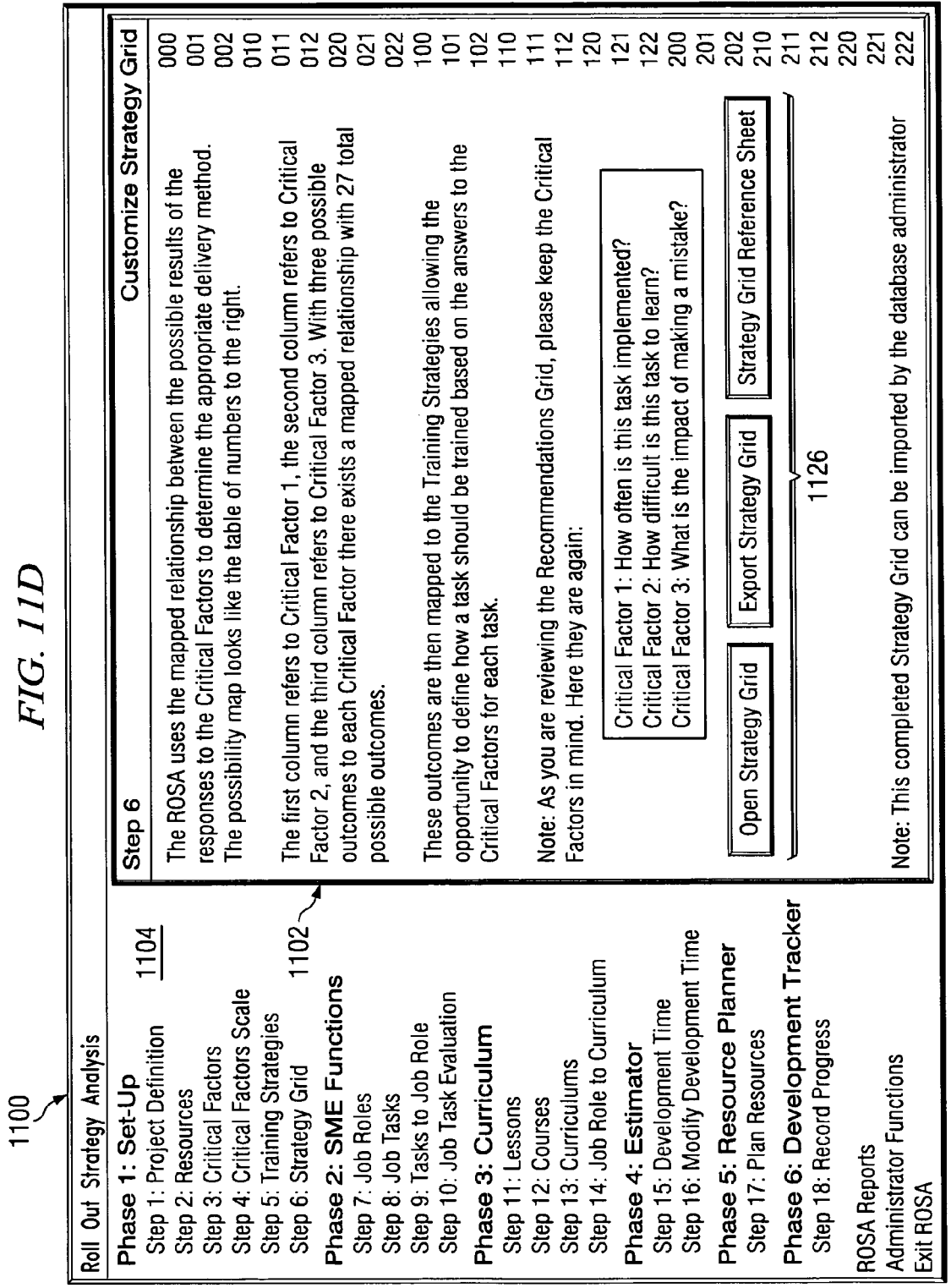
FIG. 11D is an example of a graphical user interface that may be used to customize the strategy grid in accordance with the illustrative embodiments.

Window 1102 of FIG. 11D is an example of a graphical user interface that may be used to customize the strategy grid in accordance with the illustrative embodiments. The strategy grid may be strategy grid 424 of FIG. 4. Another exemplary strategy grid is shown in FIGS. 14A-14B. Section 1126 may allow a user to select to open the strategy grid in order to modify or otherwise configure the strategy grid, export the strategy grid, and create a strategy grid reference sheet.

Figure 11E:
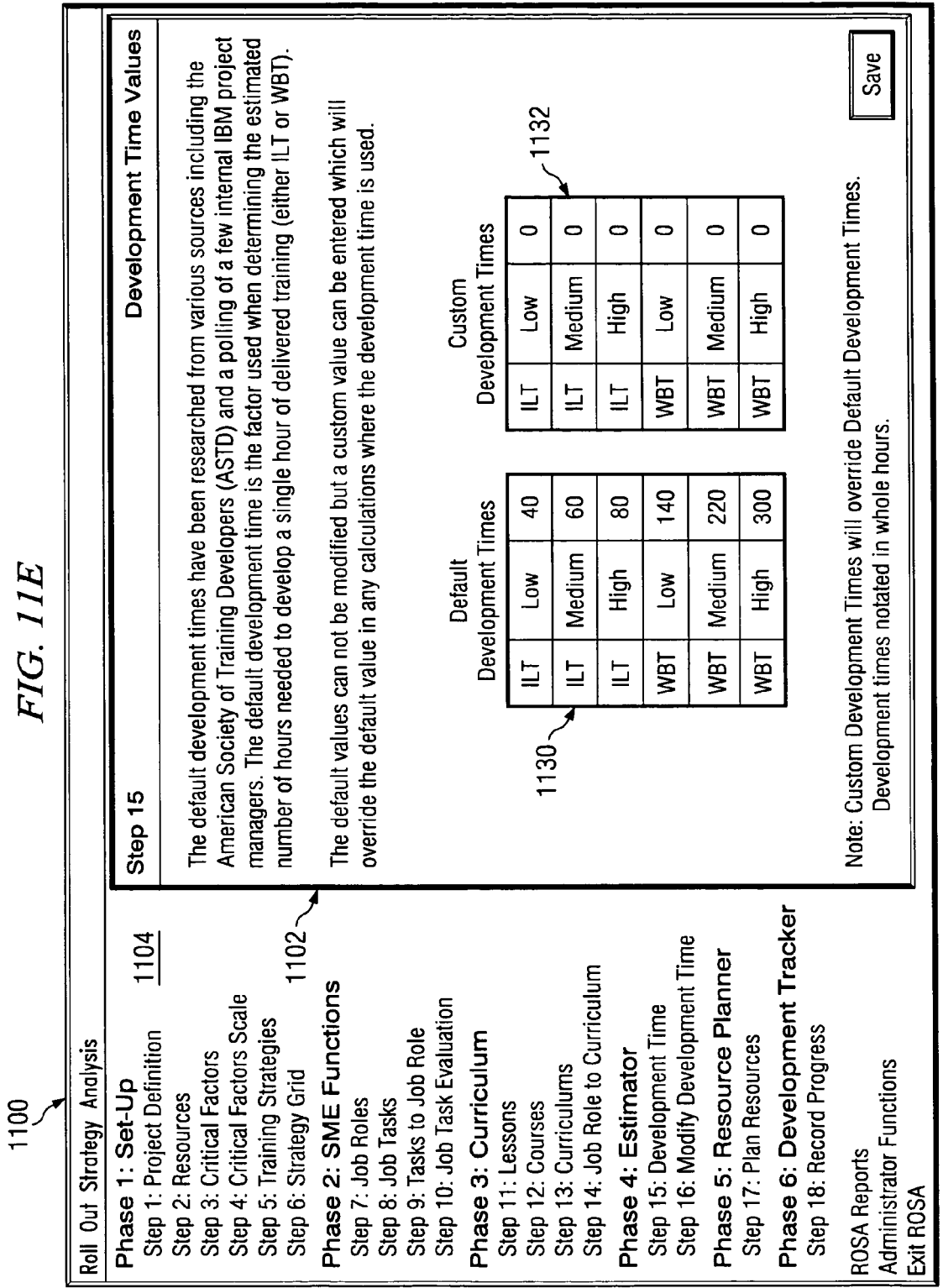
FIG. 11E is an example of a graphical user interface that may be used to establish development time values in accordance with the illustrative embodiments.

Window 1102 of FIG. 11E is an example of a graphical user interface that may be used to establish development time values in accordance with the illustrative embodiments. The development times may be development time 442 of FIG. 4. Default development times 1130 are the estimated number of hours needed to develop a single hour of delivered training. Default development times 1130 may not be modified, but custom development times 1132 may be used to override default development times 1130 in any calculations where the development time is used, based on the discretion of the user. For example, if default development times 1130 may not be applicable for an organization in which the employees rarely use computers and may need additional time for computer training.

Window 1102 of FIG. 11F is an example of a graphical user interface that may be used to determine resource requirements in accordance with the illustrative embodiments. Resource requirements may be part of resource planner 446 of FIG. 4. Section 1134 may be used to specify the number of resources, total weekly rate, and total resource cost. Section 1136 may be used to specify the number of weeks and the number of hours. The details from sections 1134 and 1136 may be further illustrated in table 1138. Table 1138 may further specify the resource title, band, rate, quantity, duration, total hours, weekly rate, and total cost. Band is the grade level of an employee, similar to the federal grade level. Band defines responsibilities, expectations, abilities, skills, and so forth. Band may be used to determine what type of training may be required to bring an individual to a desired level of competency. For example, individuals with higher bands should require less training and have more knowledge of the systems and methods of the organization.

Figure 11G:
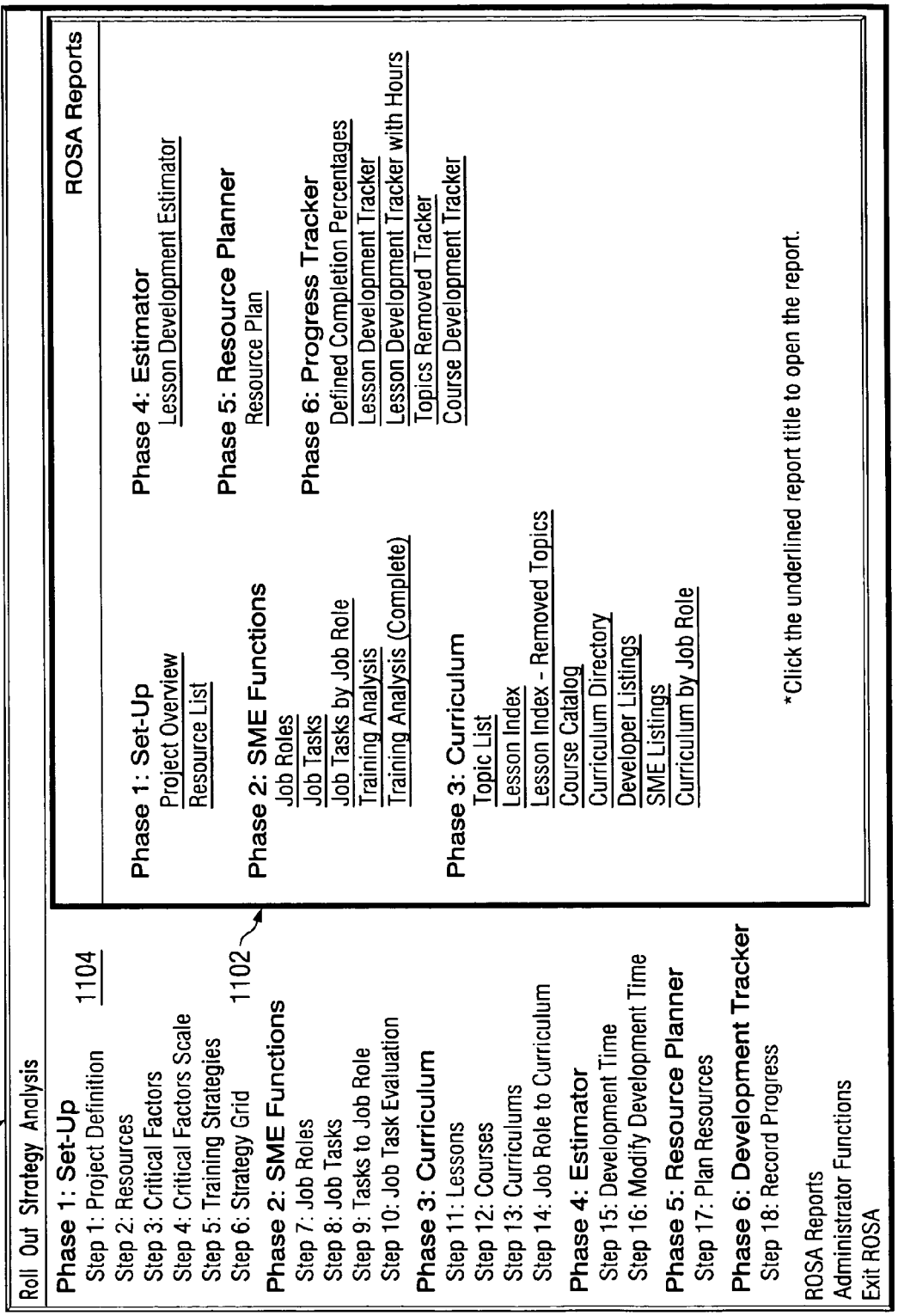
FIG. 11G is an example of a graphical user interface that may be used to generate reports for the phases and steps of a training project in accordance with the illustrative embodiments.

Window 1102 of FIG. 11G is an example of a graphical user interface that may be used to generate reports for the phases and steps of a training project in accordance with the illustrative embodiments. Particularly, window 1102 may be used to generate a series of reports that document the curriculum development at the topic, lesson and course levels, and provide development time estimations at these same levels.

FIG. 12 is an exemplary list of job roles and job tasks in accordance with the illustrative embodiments. List 1200 includes columns 1202 and 1204. Column 1202 lists job roles for the managerial account supervisor, accounting supervisor, accounts payable, and the budge analysis. Column 1204 lists the associated job tasks.

FIGS. 13A-13B are exemplary lists of training strategies in accordance with the illustrative embodiments. List 1300 includes columns 1302, 1304, 1306, and 1308 for defining the training strategies. Column 1302 details an abbreviation for the training strategy title. Column 1304 is the descriptive title of the training strategy. Column 1306 is an estimated duration to complete the training. Column 1308 is a description of the training strategy including the training requirements, user interaction, and difficulty level. Columns 1302, 1304, 1306, and 1308 may be customized as needed.

FIGS. 14A-14B are exemplary strategy grids in accordance with the illustrative embodiments. Strategy grid 1400 may be customized using graphical user interface 1100 of FIG. 11C. Strategy grid 1400 describes mapped relationships defining how a task should be trained based on the answer to the critical factors for each task. For example, the three critical factors may include: 1. How often is this task implemented?, 2. How difficult is this task to learn?, and 3. What is the impact of making a mistake?. Possibility map 1402 is the mapped results of the responses to the critical factors for determining the appropriate delivery method. The first number of possibility map 1402 refers to critical factor one, the second number refers to critical factor two, and the third number refers to critical factors three. With three possible outcomes to each critical factor, the mapped relationships of possibility map 1402 include twenty seven total possible outcomes.

Strategy grid 1400 shows how tasks 1404 should be trained according to possibility map 1402. Strategy grid 1400 may be used after defining job roles and job task to combine training strategies based on the answers to the critical factors indicated by possibility map 1402. Tasks 1404 may be combined based on possibility map 1402 for improved efficiency.

Thus, the illustrative embodiments provide a computer implemented method, apparatus, and computer usable program code for delivering training to a client organization. The database application may be used to effectively manage, monitor, and review a training project from inception through completed development. As a result, data is more effectively organized and the training project may be performed much more efficiently.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for developing training for a client, the computer implemented method being executed by a computer and comprising steps of:
   the computer identifying training delivery requirements for the client;
   the computer gathering assessment information;
   the computer developing a training curriculum based on the training delivery requirements and the assessment information;
   the computer estimating an amount of time required to complete the training to form a delivery estimate;
   the computer translating the delivery estimate into an estimate of resources required for development of training materials for the training;
   the computer verifying that the client receives the training materials for delivery to an end user; and
   the computer importing database content from a remote database for allowing off-line work and collaboration of the database content by a database application executing on the computer, wherein the database content comprises at least one of a strategy grid, job roles, a task list, and a job task evaluation, wherein the database content comprises the strategy grid, wherein the strategy grid describes mapped relationships defining how a given task should be trained based on a plurality of critical factors defined for the given task via the strategy grid presented on a graphical user interface; wherein the identifying, gathering, developing, estimating, translating, and verifying steps are performed by the database application using the collaboration of the database content executing on the computer that accesses the remote database via a network.

2. The computer implemented method of claim 1, further comprising:
   the computer tracking development, implementation, and delivery of the training; and
   wherein the gathering step further comprises:
   the computer determining the training delivery requirements.

3. The computer implemented method of claim 1, wherein the identifying step further comprises:
   the computer defining the training delivery requirements; and
   the computer validating the training delivery requirements.

4. The computer implemented method of claim 1, wherein the training delivered to the client is for a new technology being implemented by the client.

5. The computer implemented method of claim 1, wherein the training is a training project.

6. The computer implemented method of claim 5, wherein the training project is performed in phases.

7. The computer implemented method of claim 6, wherein the phases are performed in steps.

8. The computer implemented method of claim 6, wherein the database application prompts a user to enter information for performing planning, development, implementation, and tracking of a training project.

9. The computer implemented method of claim 6, wherein the database application facilitates a user in performing a roll out strategy analysis (ROSA).

10. A data processing system comprising:
    a database for storing information regarding a training project; and
    a plurality of clients operably connected to the database, wherein the plurality of clients execute a database application, wherein the database application defines and validates training delivery requirements for an organization, gathers assessment information, develops a training curriculum based on the training delivery requirements and the assessment information, estimates an amount of time required to complete the training to form a delivery estimate, translates the delivery estimate into an estimate of resources required for development of training materials, tracks implementation of the development, verifies that the organization receives the training materials for delivery to an end user; and imports database content from a remote database for allowing off-line work and collaboration of the database content by a database application executing on the computer; wherein the database contains at least one of a strategy grid, job roles, a task list, and a job task evaluation, wherein the database content comprises the strategy grid, wherein the strategy grid describes mapped relationships defining how a given task should be trained based on a plurality of critical factors defined for the given task via the strategy grid presented on a graphical user interface; wherein the identifying, gathering, developing, estimating, translating, and verifying are performed by the database application using the collaboration of the database content executing on the data processing system that accesses the remote database via a network.

11. The system of claim 10, wherein at least one of the plurality of clients executes a resource planning feature for accessing sensitive information, wherein the resource planning feature is only accessible by specified individuals.

12. The system of claim 10, wherein the database application tracks development, implementation, and delivery of the training, and determines the training delivery requirements.

13. A computer program product comprising a non-transitory computer usable medium including computer usable program code for developing training for the client, the computer program product comprising:
    computer usable program code for identifying training delivering requirements for a client;
    computer usable program code for gathering assessment information;
    computer usable program code for developing a training curriculum based on the training delivery requirements and the assessment information;

computer usable program code for estimating an amount of time required to complete the training to form a delivery estimate;

computer usable program code for translating the delivery estimate into an estimate of resources required for development of training materials for the training;

computer usable program code for verifying that the client receives the training materials for delivery to an end user; and computer usable program code for importing database contents from a remote database for allowing off-line work and collaboration of the database content by a database application executing on the computer, wherein the database content comprises at least one of a strategy grid, job roles, a task list, and a job task evaluation, wherein the database content comprises the strategy grid, wherein the strategy grid describes mapped relationships defining how a given task should be trained based on a plurality of critical factors defined for the given task via the strategy grid presented on a graphical user interface; wherein the identifying, gathering, developing, estimating, translating, and verifying are performed by the computer usable program code using the collaboration of the database content executing on the computer that accesses the remote database via a network.

14. The computer program product of claim 13, comprising:
computer usable program code for determining the training delivery requirements; and
computer usable program code for tracking development, implementation, and delivery of the training.

15. The computer program product of claim 13, further comprising:
computer usable program code for defining the training delivery requirements; and
computer usable program code for validating the training delivery requirements.

16. The computer program product of claim 13, comprising computer usable program code for generating reports about implementation of phases of the training.

17. The computer program product of claim 13, wherein the training is developed by a database application for ensuring that the client receives the training materials for delivery to end users.

* * * * *